July 20, 1926.

W. E. MAGIE ET AL 1,592,864

HYDRAULIC TRANSMISSION

Filed August 3, 1918    4 Sheets-Sheet 1

INVENTORS:
William E. Magie
and Walter Ferris.
BY
ATTORNEYS.

WITNESS:

July 20, 1926.

W. E. MAGIE ET AL 1,592,864

HYDRAULIC TRANSMISSION

Filed August 3, 1918    4 Sheets-Sheet 2

July 20, 1926.

W. E. MAGIE ET AL 1,592,864

HYDRAULIC TRANSMISSION

Filed August 3, 1918

WITNESS:
Phil J. Nawn

INVENTORS:
William E. Magie
and Walter Ferris.
BY
ATTORNEYS.

July 20, 1926.

W. E. MAGIE ET AL

HYDRAULIC TRANSMISSION

Filed August 3, 1918    4 Sheets-Sheet 4

1,592,864

INVENTORS:
William E. Magie
and Walter Ferris

WITNESS:                BY
                                ATTORNEYS.

Patented July 20, 1926.

1,592,864

UNITED STATES PATENT OFFICE.

WILLIAM E. MAGIE, OF BUFFALO, NEW YORK, AND WALTER FERRIS, OF MILWAUKEE, WISCONSIN, ASSIGNORS TO THE OILGEAR COMPANY, OF MILWAUKEE, WISCONSIN, A CORPORATION OF WISCONSIN.

HYDRAULIC TRANSMISSION.

Application filed August 3, 1918. Serial No. 248,177.

This invention relates to variable speed hydraulic transmissions of the type involving a multiple cylinder hydraulic motor connected through a hydraulic circuit with a multiple cylinder pump so as to be driven by liquid delivered by the pump.

In this type of variable speed transmissions the pump stroke is ordinarily adjustable to vary the direction and rate of delivery of driving liquid to the motor, so as to regulate the speed and direction of motion of the motor. The use of a motor whose stroke is also independently adjustable has been suggested but discarded as impractical because of the serious complications and even dangerous conditions of operation that have heretofore resulted from such use. Adjustment of the motor stroke causes a change not only in motor speed but in motor torque as well. For instance, as the motor stroke approaches zero the torque thereof approaches zero and under practical working conditions the motor so adjusted is unable to use the liquid discharged into the circuit by the pump. Dangerous excessive pressures ordinarily result. Furthermore with an independently adjustable pump and motor the speed of the motor is uncertain because it is dependent upon two independently variable factors, namely; the motor stroke and the pump stroke.

We have found however that it is frequently desirable, in the practical application of hydraulic transmissions, to vary the torque of the motor in order to efficiently meet the varying demands of the driven machine. For instance, reciprocating machines such as planers, presses and the like demand a relatively high torque at relatively low speed during the working or feeding stroke, and a relatively low torque and high speed during the return stroke. Furthermore an accurate control of speed during the working stroke is frequently desirable.

One object of the present invention is the provision of a variable speed hydraulic transmission mechanism of the type mentioned which will permit a desirable variation in motor torque and speed and at the same time avoid the objections heretofore encountered in the use of variable stroke motors. This is accomplished by placing the adjustable stroke pump and adjustable stroke motor under the control of a single control element whose position at all times determines the speed, torque and direction of operation of the motor. An accurate and easy control of motor torque and speed is thus assured. The relation of the pump and motor is also preferably such that the motor never assumes a zero stroke position, reversal of the motor being effected by reversing the pump.

Another object is the provision of a variable speed transmission in which the parts are so arranged as to avoid the necessity for adjustable or flexible connections within the hydraulic power circuit.

Another object is the provision of novel means for utilizing the working pressures in the fluid circuit to counteract and sustain the thrusts imposed upon the working parts.

Other objects and advantages will appear from the following description of an illustrative embodiment of the present invention.

In the accompanying drawings:—

Like parts are indicated by like letters in all the figures.

A is a main housing having a removable cover $A^1$. The hollow boss $A^2$ contains at its outer end an annular hydraulic bearing sleeve $A^3$ in which is mounted for rotation a shaft $A^4$ carrying a pulley $A^5$ adapted to be driven from any suitable source of power. This shaft $A^4$ I have termed the pump shaft. It carries on its inner end the pump driving disc $A^6$, the hub $A^7$ of which surrounds the end of the shaft $A^4$ and is mounted for rotation in a hydraulic pump bearing collar $A^8$. The hollow boss $A^9$ at the other end of the machine contains a hydraulic bearing ring $A^{10}$ in which is rotatably mounted the motor shaft $A^{11}$ having a pulley $A^{12}$. The inner end of this motor shaft carries the motor driving disc $A^{13}$ the hub $A^{14}$ of which encloses the inner end of the shaft $A^{11}$ and is rotatably mounted in a hydraulic motor bearing ring $A^{15}$.

B is a sliding pintle block. It has on either side outwardly extending arms $B^1$ $B^2$ $B^3$ terminating in guide shoes $B^4$ which engage tracks $B^5$ on the inner wall of the housing A. This sliding pintle block is immersed at its lower end in oil which is contained in the bottom of the housing A. $B^6$ is a controlling system extending upwardly from the sliding pintle block. It terminates in a plunger $B^7$ slidable in the cylinder $B^8$ in the cover $A^1$. $B^9$ is a screw threaded in the upper end of the system and plunger adapted to be controlled by the operator through the hand wheel $B^{10}$ to raise and lower the sliding pintle block.

C is a pump pintle and $C^1$ a motor pintle. These pintles project out on opposite sides of the pintle block B and as shown are eccentric. They are both rigidly fixed on the block so that a movement of the block moves the center of each pintle equally with respect to the centers of the motor and pump shafts. $C^2$ is a pump cylinder barrel mounted upon the pintle C, $C^3$ a motor cylinder barrel mounted for rotation upon the pintle $C^1$. These two cylinder barrels are identical in every respect, the difference in their motion being due to the fact that the pintles upon which they are mounted are on axes whose eccentricity varies simultaneously and in the same or inverse directions. A discussion of one will, therefore, suffice for both and the plungers, cylinders, bearings and associated parts in connection with each of these two cylinder barrels and motor and pump driving discs will be identical.

Each of the cylinder barrels is made up of a series of radially disposed pump or motor cylinders D D. We have shown seven. There might be more or less. Preferably in order to get smoothness and uniformity in operation, it is best for reasons which experience has proven true, to provide an uneven number of cylinders. In each of these cylinders there is mounted for reciprocation a plunger $D^1$ provided at its upper end with a laterally extended bearing block or cross head $D^2$ which bearing block or cross head is in slidable engagement with a flattened surface $D^3$ on the inner periphery of the collar $D^4$ of the pump driving disc $A^6$ or motor driving disc $A^{13}$, and is held against this surface at all times to prevent it dropping away when the pressure is released by lugs $D^5$ $D^5$ extending outwardly from the face of the discs $A^6$ $A^{13}$ beneath and at one side of the surface $D^3$. We prefer to call these lugs and associated surfaces $D^3$ a cross head guide. They are exactly the same as the well known cross head guide used in connection with steam engine ports and they hold the cross head in position so that they are free to slide but are held against withdrawal, and when the pintle is eccentric with respect to the discs $A^6$ or $A^{13}$ and if the device is rotated, the pistons will move back and forth within the cylinders as each individual cross head is moved toward and from its respective cylinder by their rotation about different axes. $D^6$ is a pressure duct extending longitudinally throughout the entire length of the plunger $D^1$ discharging at its upper end into a pocket $D^7$ in which is a coil spring $D^8$ which spring presses upwardly against the hydraulic cup $D^9$ apertured at its bottom so as to communicate with the pocket $D^7$ and slidable in an enlarged pocket $D^{10}$. This cup has an annular flange extending out into the plane of the upper surface of the cross head $D^2$ and it is expected that it will be so seated in the pocket $D^8$ that no appreciable oil leakage about the outer periphery of the cup between it and the cross head will take place but oil will be fed under pressure through the duct in the plunger, through the aperture in the bottom of the cup into the space between the cup and the working surface of the cross head guide. Thus there will be a hydraulic pressure exerted from the interior of each cylinder directly against the working surface of its crosshead guide, which will result in transmitting thrust between the two relatively moving members with a minimum of mechanical friction.

Figures 1, 13:
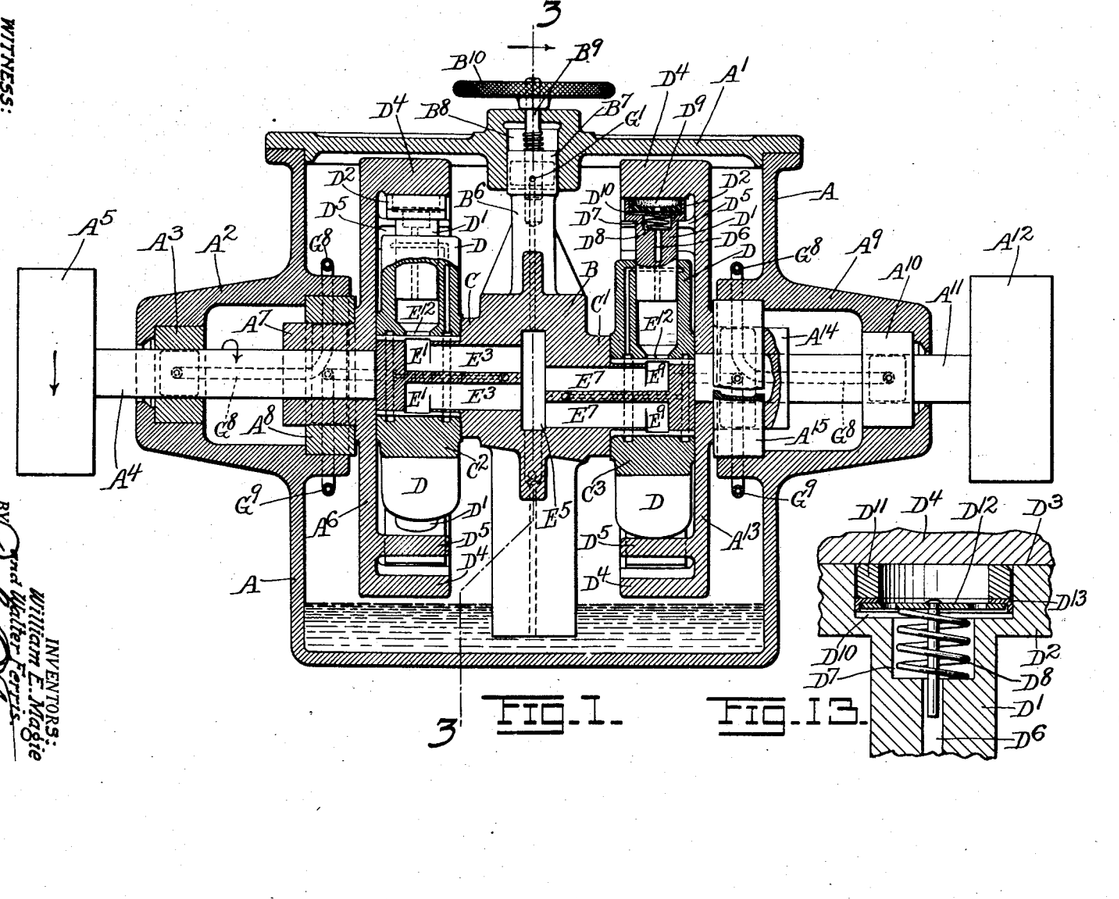
Figure 1 is a longitudinal section through the machine along the line 1—1 of Figure 3.
Figure 13 is a detailed section through a portion of one of the cross head blocks.

In the modification shown in Figure 13 we substitute for the cup $D^9$ a ring $D^{11}$ loosely mounted in the cross head held against the cross head guide by the cross bar $D^{12}$ engaged by the spring $D^8$. This cross bar may take any form. It might be a perforated disc or merely a perforated plate as shown. Oil leakage around the ring is prevented by a leather or similar flexible packing strip $D^{13}$ which bridges the gap between the ring $D^{11}$ and the wall of the cross head and makes it possible to dispense with any ground fit and its attendant expense and danger of binding.

It will be understood that the direction of rotation of the motor and pump cylinder barrels and their eccentricity control the direction of flow and the pressure of the working fluid in the main working system.

Each cylinder barrel then is mounted for rotation on one of the pintles. The pump pintle is provided with ports E E¹ communicating respectively with ducts E² E², E³ E³ on opposite sides of the pintle. These ducts extend inwardly and communicate with the chambers E⁴ E⁵ within the sliding pintle block. Similar ducts E⁶ E⁶ and E⁷ E⁷ lead from chambers E⁴ E⁵ out through the pintle C¹ to communicate with ports E⁸ E⁹. These ports E E¹ and E⁸ E⁹ are separated by partition walls E¹⁰ identical in both pintles. These partition walls have outer cylindrical boundaries forming a part of the bearing surface of the pintle and attention is called to Figure 6 where it will be noted that a rib E¹¹ extends across at right angles to the partition wall E¹⁰ but terminates short of the periphery of the pintle so that the ports E⁸ E⁹ and E E¹ are divided into two separate pockets and which, so far as the operation of the device is concerned, have no function. They are formed by the wall E¹¹ which is provided to strengthen and stiffen the pintle and provide a passage for the bleeder ducts used in connection with the reclaiming of the oil leakage. Each of the cylinders in both of the cylinder barrels is provided with a port E¹² adapted to be in register with the ports E E¹, E⁸ E⁹. These ports are of such diameter that as the cylinder barrel rotates on the pintle, the broad working surface of the partition wall E¹⁰ cuts off one cylinder after another, forming a bridge the width of which is such that there can never be a by-pass between the ports E E¹ and E⁸ E⁹ around the cylinder wall E¹⁰ but each successive port and, therefore, each successive cylinder will first be in communication with one of said ports, then out of communication with both, then in communication with the other. It will be noted also that the ducts E² E², E³ E³ are merely two separate pipes in communication with each other at each end through the central chambers and the ports. We might have substituted for them one large passage but structurally two smaller ones are better.

Extending down from the chambers E⁴ E⁵ are passages F, F¹ controlled by gravity held ball valves F² F³ which close the upper ends of the passages F⁴ F⁵ the lower ends of which are embedded in the oil reservoir. The ball valve arrangement is such that which ever one of the chambers contains fluid under positive pressure will have its ball or check valve seated, which ever one contains fluid under a negative pressure will open its ball valve and by suction a sufficient supply of motive fluid will be drawn up through the reservoir to completely fill the system and replace that motive fluid which leaks out.

Figure 2:
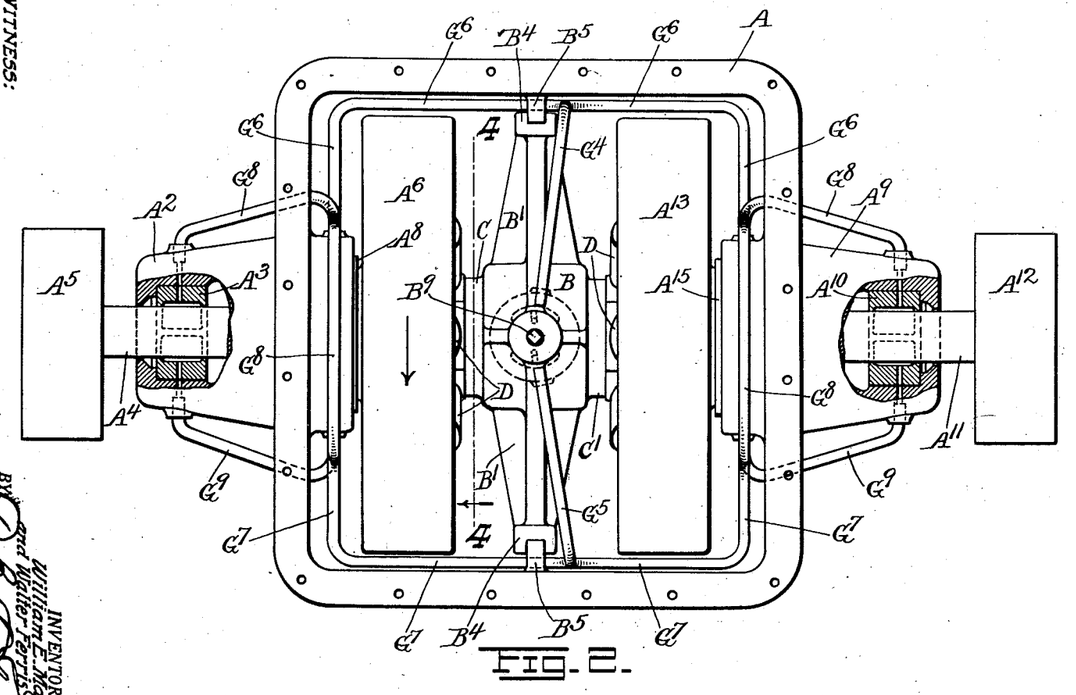
Figure 2 is a plan view in part section with cover removed.

Extending upwardly from the chambers E⁴ E⁵ are ducts G G¹ discharging respectively into the separated chambers G² G³ adjacent the plunger B⁷. Leading from the chamber G² G³ are pipes G⁴ G⁵. These pipes extend down along the tracks B⁵ B⁵ and communicate with the horizontally disposed pipes G⁶ G⁷ respectively. The pipes G⁶ and G⁷ communicate with the hydraulic bearing rings A⁸ and A¹⁵ on the lower side thereof as shown in Figure 2 that is on that side which is cut away in Figure 1. Communicating with these pipes G⁷ and extending up around the bearing on the outside are pipes G⁸ G⁸. These pipes curve down around the bearing and then pass through the housing wall and communicate with the hydraulic bearing rings A³ A¹⁰ on the upper side of Figure 2, that is on the side shown in Figure 1. The pipes G⁶ G⁶ communicate with the opposed sides of the hydraulic bearing rings A⁸ A¹⁵, that is on the upper side shown in Figure 2 and on the visible side in Figure 1. Communicating with these pipes where they join the bearing ring are pipes G⁹ G⁹ which extend around beneath the bearings and then out through the wall of the casing and communicate with the hydraulic bearing rings A³ A¹⁰ on the opposed sides, that is on the lower side in Figure 2 and on the side which is cut away in Figure 1. Attention is here called in general terms to the fact that when for instance the lower side of the pump looking down in Figure 2 is the pressure side, the pump barrel being fixed on the pintle will tend to force the member A⁶ down and that will be resisted by the pressure on the lower side of the hydraulic ring. This will tend to twist the pump shaft in a clockwise direction as you look down upon it and that will be resisted by pressure carried over to the opposed side of the hydraulic pressure bearing ring. The same situation prevails in connection with the pressure on the pump.

Figures 3, 5, 6, 7, 8:
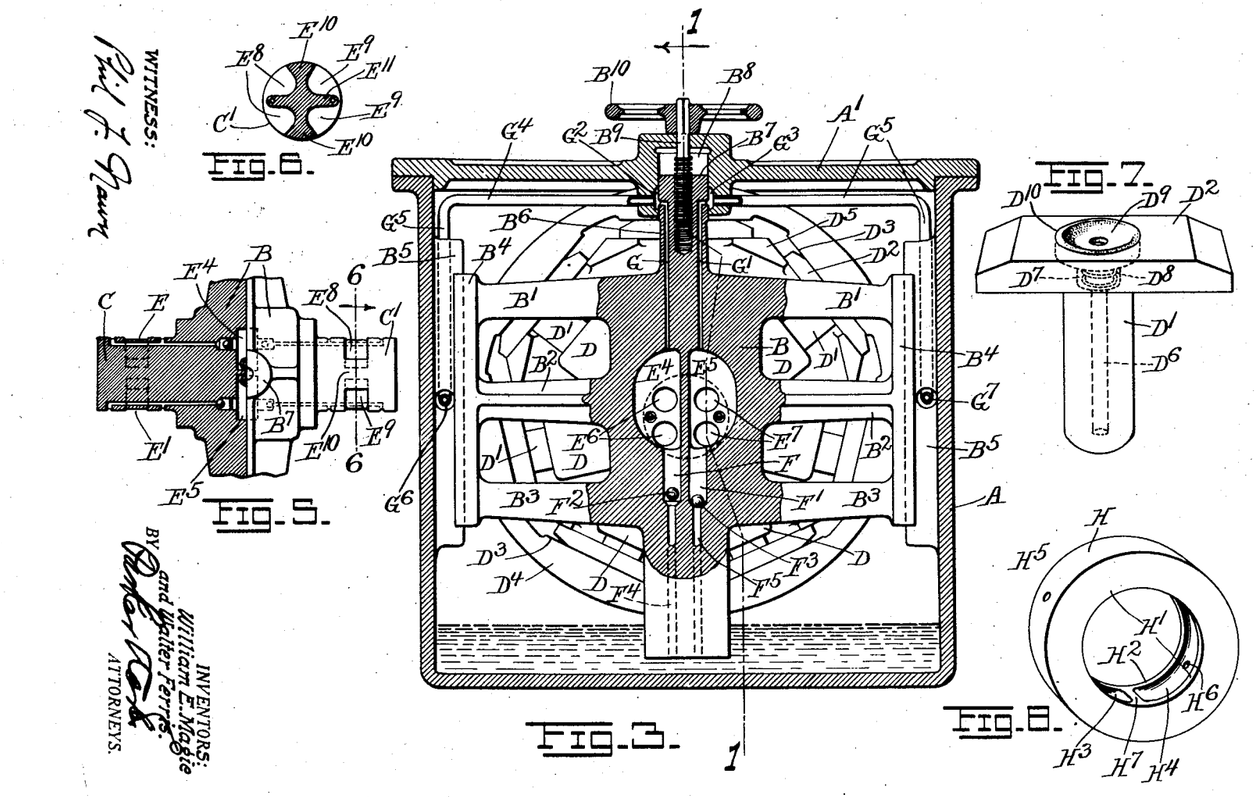
Figure 3 is a section along the line 3—3 of Figure 1.
Figure 5 is a part section and part plan view of part of the sliding pintle block.
Figure 6 is a section on the line 6—6 of Figure 5.
Figure 7 is a perspective of one of the cross head blocks.
Figure 8 is a perspective of one of the bearing collars.

There are four hydraulic bearing rings A³, A⁸, A¹⁵ and A¹⁰. They vary somewhat in size but are identical so far as arrangement, function and shape is concerned. They consist in a collar having two substantially semicircular annular pockets. Figure 3 which shows one of them in perspective will suffice for all.

Each one of these rings is made up of a cylindrical portion H having opposed annular walls H¹ H² to form two separate pressure pockets H³ H⁴ there being ports H⁵ H⁶ whereby the pressure pipes previously described may enter these pockets and fill them with the working fluid under pressure. These pockets are separated by partitions H⁷ which divide the circumference of the collar into two substantially equal parts just slightly less than 180° each. The light load can be carried by the edges of the two annular walls and by the cross partitions that is when the pump or motor is running light without any load and there is no pressure in the system then the bearing pressures are caused merely by the weight of the parts and the pressure is so low that no special arrangement need be made to carry them. When the machine begins to work the bearing pressures rise. At the same time the hydraulic pressure rises and if we properly design the bearings in the first place no matter how great the bearing pressure becomes the increase of the hydraulic pressure will just compensate for it and we will have a hydraulic bearing at all times upon which the moving parts are always free to float and if we change the direction of movement of the working fluid and thus make what was once the pressure side now become the suction side and vice versa, it will be noted that the bearing loads will be reversed and so the reversal in pressures will counterbalance the reversal in bearing loads and hydraulic bearing will continue to operate.

It will be observed that any leakage in operation between any of the different bearing parts will eventually find its way into the reservoir in the bottom of the tank or housing and will be replaced by suction caused by the absence of pressure in one or the other of the central chambers within the pintle block.

It will be evident that while I have shown in my drawings an operative device, still many changes might be made both in size, shape and arrangement of parts without departing materially from the spirit of our invention and we wish, therefore, that our drawings be regarded as in a sense diagrammatic.

The use and operation of our invention are as follows:—

Referring first to Figures 9 to 12, it will be understood that in each case the pump is represented by the open line structure on the left side. The sliding pintle block is represented by the heavy black structure and the motor by the light line structure on the right. In our present form we have shown the axes of rotation of pump and motor side fixed while the pintle block slides to change the axes of rotation of the motor and pump cylinder barrels. Obviously, of course, it might be possible and the same result would be obtained if we made the pump and motor disc axes different and made the pintles of the two barrels on the same line. Or we might have all four of them off center and might move the pintles or move the motor and pump discs. The geometric and pumping result would be the same. We have preferred, however, for the sake of clearness to confine ourselves to the one form shown. It will be observed also that the pump always rotates in one direction as indicated by the arrow. Starting with the situation of Figure 9, we find that the pintle block is so positioned that the pintle upon which the pump cylinder barrel rotates is concentric with the pump driving disc and so even though the pintle upon which the motor barrel is mounted is not concentric with the motor driving disc no movement on the motor side takes place because there is no reciprocating movement of any of the pump pistons and no pumping is done.

Figure 10:
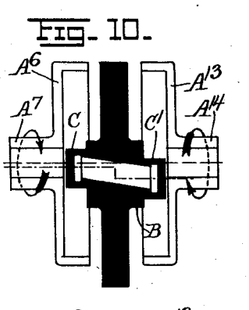
Figure 11:
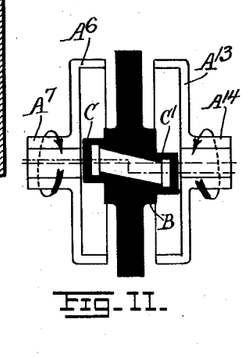

In Figure 10, we show the sliding pintle block moved down so that its axes of rotation is say 1/8 inch off center. This gives a stroke of 1/4 inch for each pump piston between extreme in and extreme out position. This adds to the eccentricity of the motor. Motive fluid is circulated under pressure and the pressure on the motor pistons causes them to reciprocate and causes rotation of the motor driving disc. But because the eccentricity of the pump is as shown here only 1/8 inch while the eccentricity of the motor is 1 1/8 inches the pump stroke being 1/4 inch, the motor stroke being 2 1/4 inches, the speed of the motor will be much less than the speed of the pump and the torque of the motor will be very high compared to the pump torque. In Figure 11, we have shown the sliding pintle block moved up so that the eccentricity is 1/8 inch in the opposite direction. This reduces the eccentricity of the motor to 7/8 inch. Now the pump stroke is 1/4 of an inch but the motor stroke is only 1 3/4 inches and the result of this is that the rotational speed of the motor more closely approaches that of the pump and the motor is speeded up at the expense of a slight reduction in torque.

Figure 12:
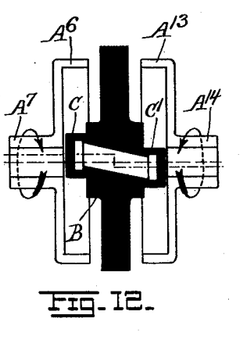

In Figure 12, we have shown the sliding pintle block moved up so that the pump eccentricity is 5/8 inch, the stroke is 1 1/4 inch and the motor eccentricity is only 3/8 inch. The motor stroke is 3/4 inch or less than the pump stroke, therefore the motor travels at a much higher speed than the pump and with correspondingly reduced torque.

It will be observed that in Figs. 11 and 12 the direction of rotation of the motor has been reversed from what it was in the arrangement shown in Figure 10, because, of course, when we change the eccentricity of the pump through an angle of 180° we make what was at first the pressure side become the suction side and what was the suction side becomes the pressure side and so that side of the motor system which before took oil under pressure from the pressure side of the pump now is exhausting oil in the suction side of the pump and the motor will be reversed.

In connection with the hydraulic bearing system, attention is called to the fact that when we change the pressure sides of the pump and make what was the pressure side now act as the suction side we make the same change in the motor and also make an equivalent or corresponding change in the bearing loads and thus do not interfere with the supporting of the bearing loads by the hydraulic pressure generated in the system.

In order to make the action fully clear, we shall point out the circulation of the motive fluid in operation.

Starting with the motor rotating in the direction indicated by the arrows in Figure 2, we will assume that the sliding pintle block is moved down so as to give the pump the eccentricity shown in Figure 10. This makes the lower side as shown in Figure 2 the pressure side because as the pistons rotate in the downward direction the plungers are gradually forced into the cylinders exerting the pressure and as they start up on the opposite side they are drawn out causing a suction. In the present instance then $E^1$ is the port which takes the working fluid under pressure from the cylinders of the pump cylinder barrel. This working fluid travels through the passages $E^3$ to the chamber $E^5$, thence through the passages $E^7$ to the port $E^9$ whence the fluid passes into the cylinders on the pressure side of the pump to rotate it. As the cylinders pass one after another across the partition wall between the pressure and suction ports they will discharge their fluid into the port $E^8$ whence it passes back at low pressure through the passage $E^6$, chamber $E^4$, passage $E^2$ and port $E$ to ports $E^{12}$ in the cylinders on the suction side of the pump. When this circulation is taking place the position of the two ball valves in passages $F$ and $F^1$ will be as shown in Fig. 3. The ball valve $F^3$ will be seated preventing escape of high pressure fluid, and valve $F^2$ will be lifted, permitting working fluid to be sucked up to replace that which leaks out at the different bearings and units.

Figure 4:
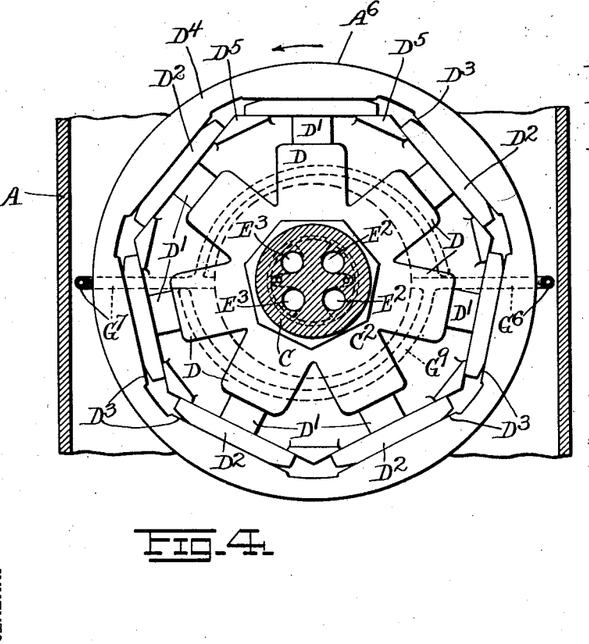
Figure 4 is a detailed section along the line 4—4 of Figure 2.
Figure 9:
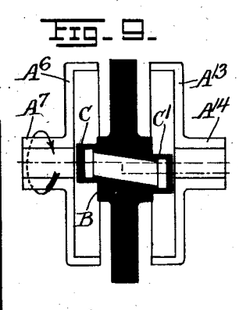
Figures 9, 10, 11 and 12 are diagrammatic views showing the relation between pintles and cylinder barrels under conditions of different speed ratios.

If on the other hand we raise up on the sliding pintle block without changing the direction of rotation of the pump so that the axis of rotation of the pump barrel is above the axis of rotation of the driving disc we have the pistons gradually being thrust into the cylinders on the up stroke, that is on the right hand side of Figure 4, and the motive fluid will be squeezed out of these cylinders under pressure in the passages $E^2$ thence travelling to the chamber $E^4$, passages $E^6$ and left hand side of the cylinder barrel in Figure 3 to cause a rotation of the motor driving disc. This, of course, will cause the motor driving disc to rotate in a counter clockwise direction because, of course, the pressure will tend to force the pistons out of the plungers and this can only be done in company with the downward movement of each piston, cross head and cylinder. As rotation takes place the working fluid having done its work will discharge into the passages $E^7$ where it will travel thence into the chamber $E^5$ through the passages $E^8$ and be sucked back into the motor on the suction side.

Of course, if the stroke is the same on both the motor and pump ends the displacement will be the same and the speed of rotation will be the same. If the eccentricity and therefore the stroke of one is greater than the eccentricity and stroke of the other, then the displacement of motive fluid at each revolution of that member which has the greatest stroke will be greater than the displacement of the other and therefore in the well known manner the member having the smaller displacement will move at a relatively higher speed.

It will be noted as shown more clearly in Figure 3, that the two systems, both the high and low pressure systems and they may be one or the other because the high or low pressure systems are interchangeable depending upon the direction of rotation are connected with the reservoir at the bottom so that which ever system is the low pressure system, will have an opportunity to suck fluid from the reservoir up into the system to keep it filled. The check valves are provided, of course, to prevent escape of the fluid under pressure from the pressure side while permitting ingress of fluid to the suction side.

We claim:—

1. In a hydraulic transmission, a pump comprising a revolving driving part and a revolving driven part, a motor comprising a revolving driving part and a revolving driven part, a shifting member carrying one of the revolving parts of the pump and one of the motor, and means for traversing said member and thereby simultaneously varying the respective distances between the axes of revolution of the two revolving parts in the pump and in the motor.

2. In a hydraulic transmission, a pump and a motor each comprising rotating driving and driven members, and cylinders and plungers operated by said rotating members and having strokes dependent upon the distance between their axes of revolution, and a shifting member carrying one part of the pump and one part of the motor whereby said strokes are simultaneously changed.

3. In a hydraulic transmission, a casing, a pump revolving disc and a motor revolving disc mounted therein for rotation about fixed axes, a shifting member mounted in the casing and carrying in relatively fixed positions a pump cylinder barrel and a motor cylinder barrel, the axes of revolution of the corresponding pairs of revolving discs and cylinder barrels being so disposed that the shifting axis of the pump may be placed coincident with its corresponding fixed axis or upon either side thereof while the shifting axis of motor remains on the same side of its corresponding fixed axis, thereby obtaining reversal of motor.

4. In a hydraulic transmission a cylinder, a plunger closely fitted therein, a plane driving surface abutting against the outer end of said plunger, a cavity in the outer end of said plunger in communication with the interior of the cylinder, whereby a thrust is communicated from said cylinder to said plane driving surface, partially or entirely by direct fluid pressure against the driving surface.

5. In a hydraulic transmission, a cylinder containing fluid under pressure, a plunger closely fitted therein and having a crosshead formed at its outer end abutting against a plane driving surface, a packing plate mortised into the outer end of the crosshead and having a cavity in its outer surface, and means for introducing into said cavity fluid under pressure from within the cylinder.

6. In a hydraulic transmission, a pump or motor comprising a revolving part supported by a bearing a working fluid circuit having a high pressure and a low pressure branch, a pressure cavity in the contact surface of said bearing and means for transmitting the pressure in the high pressure branch of the fluid circuit to the pressure cavity in said bearing surface.

7. In a hydraulic transmission a reversible pump or motor having a revolving part supported by a bearing, a working fluid circuit connected with said pump or motor and having two branches carrying respectively a high and a low pressure and interchanging their pressures upon reversal of pump or motor, two pressure cavities in the bearing connected respectively with the two working circuit branches and carrying the interchanging pressures therein, whereby hydraulic pressures in the bearing counteract the bearing reactions.

8. In a hydraulic transmission a reversible pump or motor having a revolving part supported by a bearing, a working fluid circuit connected with said pump or motor and having two branches carrying respectively a high and low pressure and interchanging their pressures upon reversal of pump or motor, two pressure cavities in the bearing, said cavities being connected respectively with the two branches of the working circuit whereby the hydraulic reactions in the bearing cavities are always proportional and in opposition to the mechanical reactions against said bearings due to the same hydraulic pressures acting in the pump or motor mechanism.

9. In a hydraulic transmission, a reversible pump or motor having a revolving part mounted in two bearings, a working fluid circuit connected with said pump or motor and comprising a high pressure and a low pressure branch, each of said bearings having two oppositely disposed cavities and connections whereby one of the cavities in each of the two bearings is connected to the high pressure port and the other cavity in each of the two bearings is connected to the low pressure port.

10. In a hydraulic transmission the combination of a variable displacement pump, a variable displacement motor, a rigid member connecting said pump and motor and having a passage therethrough for transmitting fluid from said pump to said motor, and means for adjusting said member to simultaneously vary the displacements of said pump and motor.

11. A hydraulic transmission comprising a pump and a motor and a closed working circuit connecting them means for simultaneously varying the displacement of both of them and changing the direction of flow of the working fluid from the pump, said displacement varying and direction changing means comprising a sliding block having means for supporting parts of said pump and motor, and means for sliding the block to change the displacement of said pump and motor.

12. A hydraulic transmission comprising a pump and a motor and a closed working circuit connecting them, means for changing both the speed and the direction of the motor with respect to the pump, comprising means for varying the displacement of both pump and motor and for changing the direction of the flow of working fluid from the pump, said displacement varying and direction changing means comprising a sliding block having means for rotatably supporting parts of said pump and motor, and means for sliding the block.

13. In a hydraulic transmission the combination of a pump having a radial series of relatively reciprocating piston and cylinder elements, a motor having a radial series of relatively reciprocating piston and cylinder elements, a rigid member extending from the center of said pump to the center of said motor and forming a fluid conduit therebetween, and means for adjusting said member to vary the relative displacements of said pump and motor.

14. In a hydraulic transmission the combination of a variable displacement pump having a series of relatively reciprocating piston and cylinder elements, a motor having a series of relatively reciprocating piston and cylinder elements, a rigid member extending from said pump to said motor and forming a fluid conduit therebetween, and means for adjusting said member to vary the extent of reciprocation of the piston and cylinder elements of said pump.

15. In a hydraulic transmission the combination of a pump having a series of relatively reciprocating piston and cylinder elements, a variable displacement motor having a series of relatively reciprocating piston and cylinder elements, a rigid member extending from said pump to said motor and forming a fluid conduit therebetween, and means for adjusting said member to vary the extent of reciprocation of the piston and cylinder elements of said motor.

16. In a hydraulic transmission the combination of a pump having a series of relatively reciprocable piston and cylinder elements radiating from a center, a motor having a series of relatively reciprocable piston and cylinder elements radiating from a center, a rigid member extending from one center to the other, and means for adjusting said member to vary the relative displacements of said pump and motor.

Signed at Buffalo, New York, this 23rd day of July, 1918.

WILLIAM E. MAGIE.

Signed at South Milwaukee, Wisconsin, this 15th day of July 1918.

WALTER FERRIS.